US008403629B2

(12) United States Patent  
Lundbladh

(10) Patent No.: US 8,403,629 B2  
(45) Date of Patent: Mar. 26, 2013

(54) STATOR FOR A JET ENGINE, A JET ENGINE COMPRISING SUCH A STATOR, AND AN AIRCRAFT COMPRISING THE JET ENGINE

(75) Inventor: Anders Lundbladh, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 897 days.

(21) Appl. No.: 11/718,727

(22) PCT Filed: Oct. 20, 2005

(86) PCT No.: PCT/SE2005/001572
§ 371 (c)(1),
(2), (4) Date: Feb. 28, 2008

(87) PCT Pub. No.: WO2006/049551
PCT Pub. Date: May 11, 2006

(65) Prior Publication Data
US 2008/0213088 A1    Sep. 4, 2008

(30) Foreign Application Priority Data

Nov. 5, 2004    (SE) ........................ 0402714

(51) Int. Cl.
*F01D 5/14*    (2006.01)
(52) U.S. Cl. ..... 415/115; 415/116; 415/117; 415/208.2; 415/211.2
(58) Field of Classification Search ............ 415/115, 415/208.1, 208.2, 211.2, 116, 117, 144
See application file for complete search history.

(56) References Cited

U.S. PATENT DOCUMENTS

| | | | |
|---|---|---|---|
| 3,693,880 A | | 9/1972 | Versaw et al. |
| 3,815,360 A | | 6/1974 | Wellinitz |
| 3,956,887 A | * | 5/1976 | MacDonald ............. 60/793 |
| 4,007,587 A | | 2/1977 | Banthin et al. |
| 4,095,417 A | | 6/1978 | Banthin |
| 4,099,375 A | | 7/1978 | Inglee |
| 4,136,518 A | * | 1/1979 | Hurley et al. .............. 60/264 |
| 6,357,999 B1 | * | 3/2002 | Pearce et al. ............. 415/115 |
| 6,606,854 B1 | | 8/2003 | Siefker et al. |
| 7,195,456 B2 | * | 3/2007 | Aggarwala et al. ....... 415/208.2 |
| 2004/0255573 A1 | * | 12/2004 | Rago ..................... 60/262 |

OTHER PUBLICATIONS

International Search Report from corresponding International Application PCT/SE2005/001572, date of mailing Mar. 1, 2006.
Supplementary European Search Report for corresponding European Application EP 05 79 4579, Date of search completion Dec. 12, 2011.

* cited by examiner

*Primary Examiner* — Christopher Verdier
*Assistant Examiner* — Jason Davis
(74) *Attorney, Agent, or Firm* — WRB-IP LLP

(57) ABSTRACT

A stator for installation in a rear section of a jet engine includes a plurality of guide vanes which extend in the radial direction of the stator and between them define ducts for leading a gas. A first side of the stator in its axial direction defines an inlet for the gas and a second side, opposite the first side, defines an outlet for the gas. The guide vanes have such a shape that together they at least substantially cover the gas inlet viewed in the axial direction of the stator from the outlet side thereof.

15 Claims, 4 Drawing Sheets

A-A

STATOR FOR A JET ENGINE, A JET ENGINE COMPRISING SUCH A STATOR, AND AN AIRCRAFT COMPRISING THE JET ENGINE

BACKGROUND AND SUMMARY

The present invention relates to a stator for installation in a rear section of a jet engine, the stator comprising a plurality of guide vanes which extend in the radial direction of the stator and between them define ducts for leading a gas, and a first side of the stator in its axial direction defining an inlet for the gas and a second side, opposite the first side, defining an outlet for the gas. The invention further relates to a jet engine comprising the stator and an airplane comprising the jet engine.

The term jet engine is intended to include various types of engines which take in air at a relatively low velocity, heat it up through combustion and expel it at a much higher velocity. The term jet engine includes turbojet engines and turbofan engines, for example.

The jet engine conventionally comprises a compressor section for compression of the intake air, a combustion chamber for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft.

The jet engine can be used for the propulsion of various types of jet-propelled craft including both land and waterborne craft, but the invention is primarily intended for applications in an aircraft, and in particular in an airplane engine.

Protecting an airplane against possible attack by giving the airplane a low so-called signature is already known. The term signature in this context refers to the contrast with the background. An airplane should have a low signature in respect of such things as infrared radiation (IR) and radar, for example. Hot structures and hot exhaust gases give rise to an IR signature. Metal surfaces of the jet engine, such as turbine parts, can give rise to an IR signature when they become hot during operation of the jet engine.

The present invention is directed towards a propulsion device for an airplane which is designed to produce a low signature.

It is desirable to provide a stator for a jet engine which will give the jet engine a reduced signature in operation. In particular it is intended to produce a reduction in the infrared radiation emitted from the jet engine. It is also desirable that the stator should afford a substantially reduced signature with minimal loss of performance in the operation of the jet engine.

According to an aspect of the present invention, a stator for installation in a rear section of a jet engine is provided, the stator comprising a plurality of guide vanes which extend in the radial direction of the stator and between them define ducts for leading a gas, and a first side of the stator in its axial direction defining an inlet for the gas and a second side, opposite the first side, defining an outlet for the gas, characterized in that said guide vanes have such a shape that together they at least substantially cover said gas inlet viewed in the axial direction of the stator from the outlet side thereof.

According to an aspect of the present invention, two adjacent guide vanes overlap one another in a circumferential direction, or at least form a substantially continuous structure in a circumferential direction, viewed in the axial direction of the stator from the outlet side thereof. When the stator is installed in the jet engine, internal hot/reflective parts of the engine will be hidden from rear view.

According to a further aspect both an inlet section and an outlet section of each guide vane basically extend in an axial direction and a section between the inlet section and the outlet section extends in a direction with a component in the circumferential direction of the stator. This makes it possible to achieve an overlapping, or at least substantially continuous structure in a circumferential direction. A plurality of said guide vanes preferably have the basic cross-sectional shape of an elongated Z.

According to a further aspect at least one of said guide vanes is hollow for leading a coolant. This allows the guide vanes to be cooled in operation.

According to a further aspect the stator comprises a radially outer ring, the guide vanes being firmly connected to the outer ring and the outer ring defining an inner duct for a core flow and an outer duct for a fan flow. At least one of the guide vanes comprises a radially outer opening, which is connected to the fan air duct in order to lead a proportion of the fan air into the interior of the guide vane and to cool the guide vane. In flight it is advantageous to use the fan air flow (rather than air from the surroundings) for cooling since an advantageous pressure ratio ensues. In flight a pressure ratio of >2 relative to the ambient pressure often occurs. The fan air therefore has a relatively high pressure.

BRIEF DESCRIPTION OF THE DRAWINGS

The invention will be described in more detail below with reference to the embodiments shown in the drawings attached, of which

DETAILED DESCRIPTION

Figure 1:
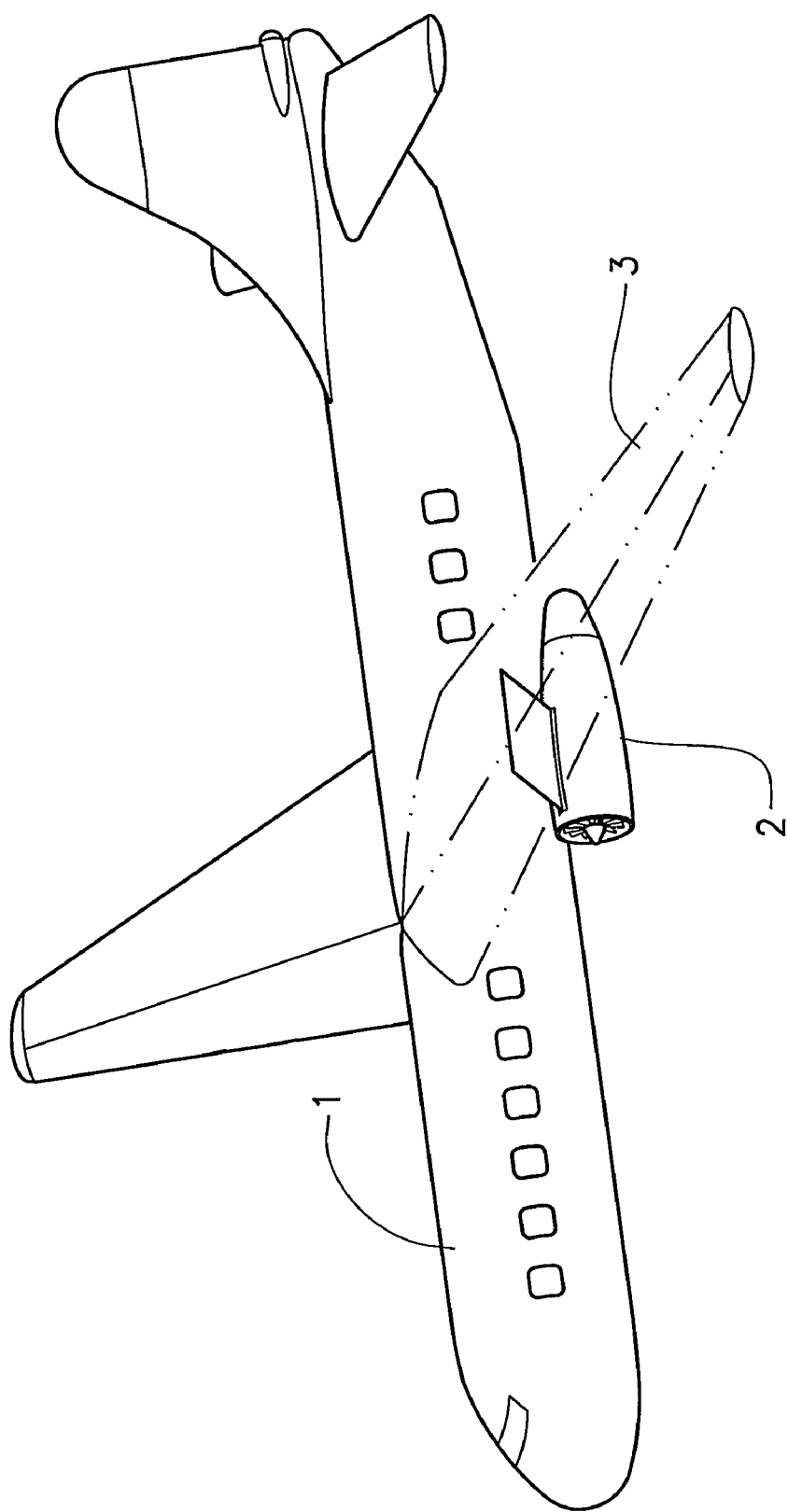
FIG. 1 shows a schematic, perspective view of an airplane comprising an aero engine.
Figure 2:
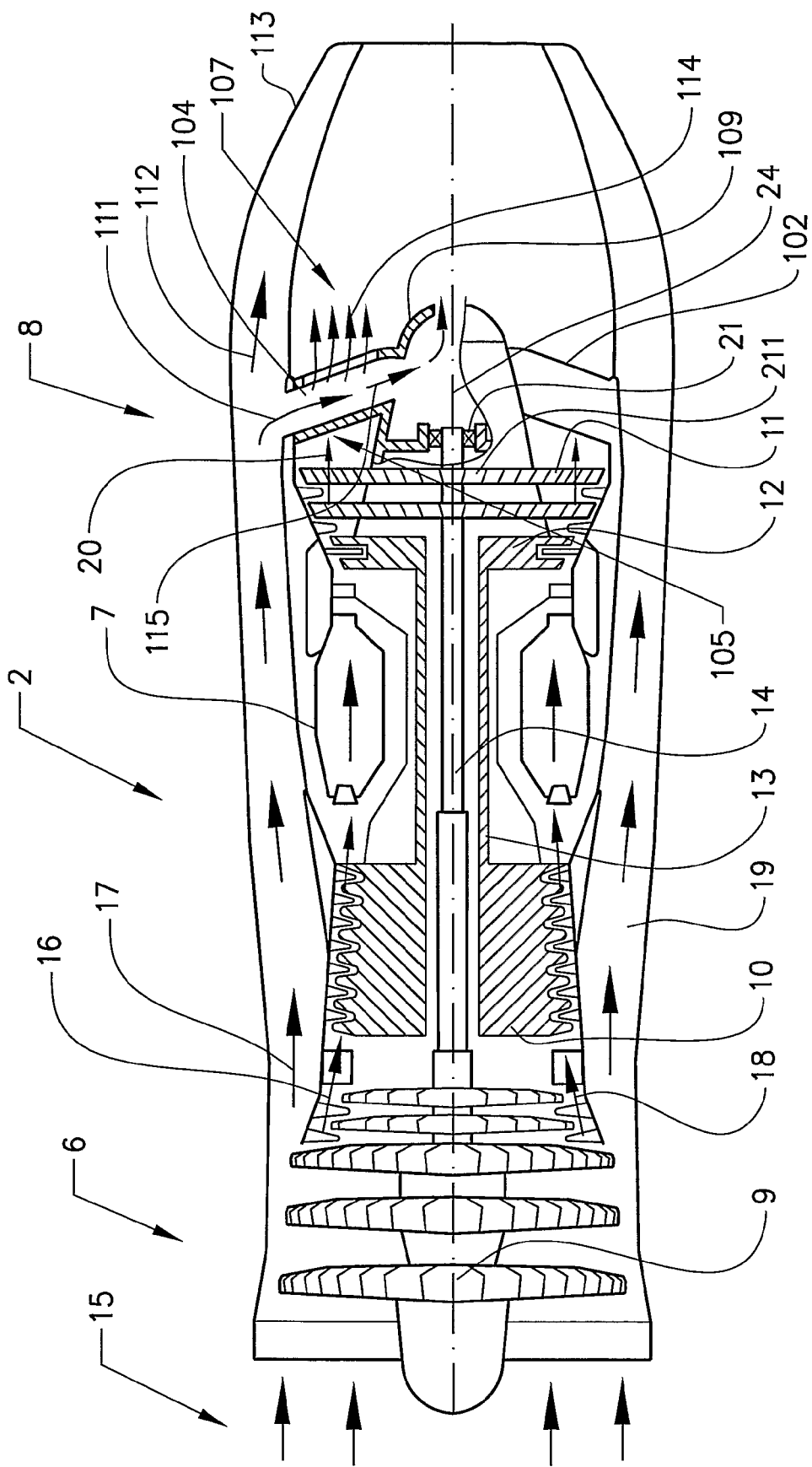
FIG. 2 shows a cross-sectional view of the aero engine, which comprises a stator arranged behind a rear turbine.

FIG. 1 shows a schematic, perspective view of an airplane 1. A jet engine 2, see also FIG. 2, for propelling the airplane 1 is mounted underneath a wing 3. FIG. 2 shows a cross-sectional view of the jet engine 2. The jet engine 2 is of the double-flow type and has double rotors.

The jet engine 2 comprises a compressor section 6 for compression of the intake air, a combustion chamber 7 for combustion of the compressed air and a turbine section 8 arranged behind the combustion chamber, the turbine section being rotationally connected to the compressor section in order to drive this by means of the energy-rich gas from the combustion chamber.

The compressor section 6 comprises a low-pressure part 9, or fan, and a high-pressure pad 10. The turbine section 8 comprises a low-pressure part 11 and a high-pressure part 12. The high-pressure compressor 10 is rotationally locked to the high-pressure turbine 12 via a first shaft 13 and the low-pressure compressor 9 is rotationally locked to the low-pressure turbine 11 via a second shaft 14. In this way a high-pressure rotor and a low-pressure rotor are formed. These are supported concentrically and rotate freely in relation to one another.

The jet engine 2 is, as stated, of the double-flow type, which means that once it has passed through the fan 9 an intake air flow 15 is divided into two flows, —an inner, compressor air flow 16, and an outer, an air flow 17. The jet engine 2 therefore comprises a radially inner main duct 18 for a primary flow to the combustion chamber 7 and a radially outer duct 19 for a secondary flow (bypass for fan flow). The gas ducts 18, 19 are concentric and annular. The inner gas flow emerging from the jet engine 2 is hereinafter referred to as the core flow 20.

The fan flow 17 and the core flow 20 are both in a direction basically parallel to the axial direction 24 of the jet engine 2 out of the jet engine 2. A stator 102 in the form of a rear engine case is arranged behind a rear turbine wheel 211 in the low-pressure turbine 11 in a rear section of the jet engine 2. The stator 102 is here integrated into the jet engine 2 as a back stator.

Figure 3:
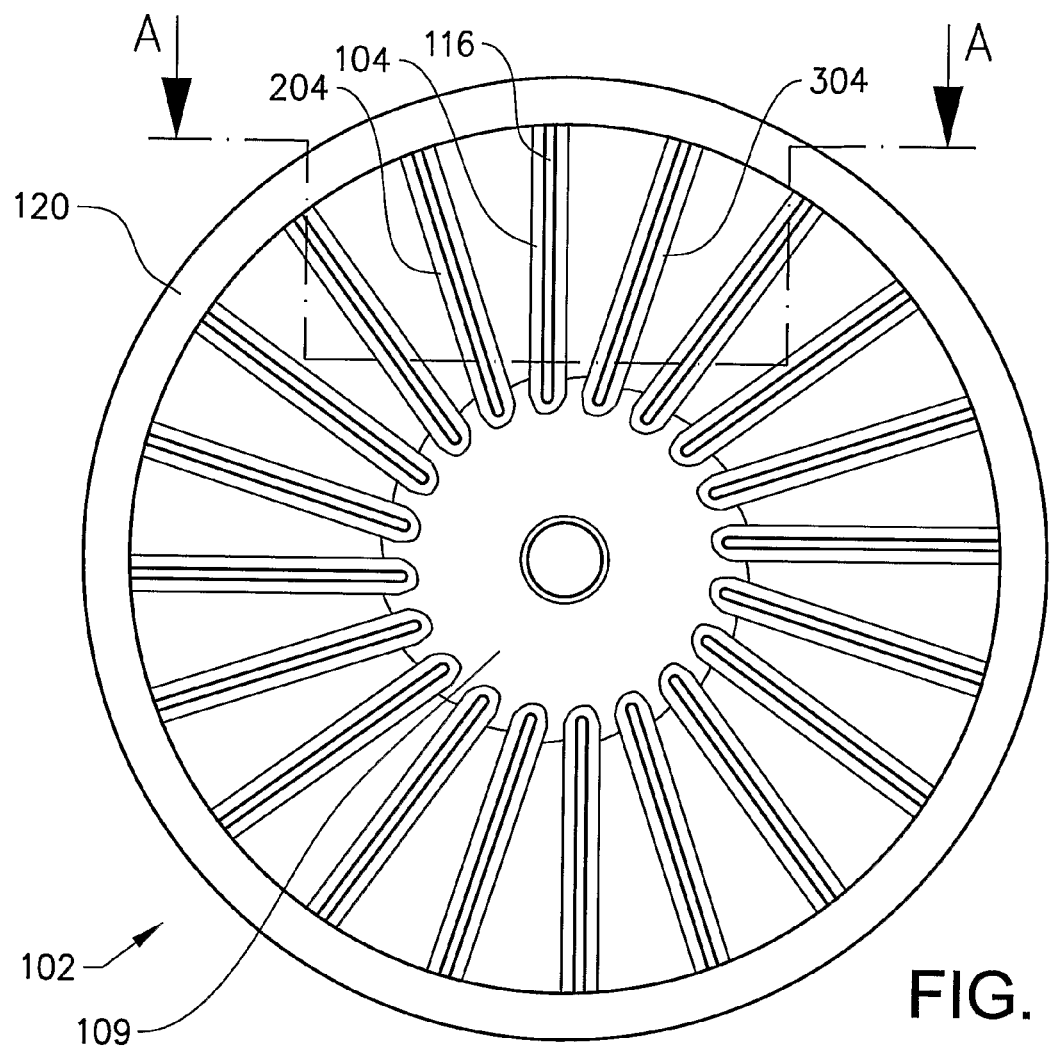
FIG. 3 shows a rear view of the stator.
Figure 4:
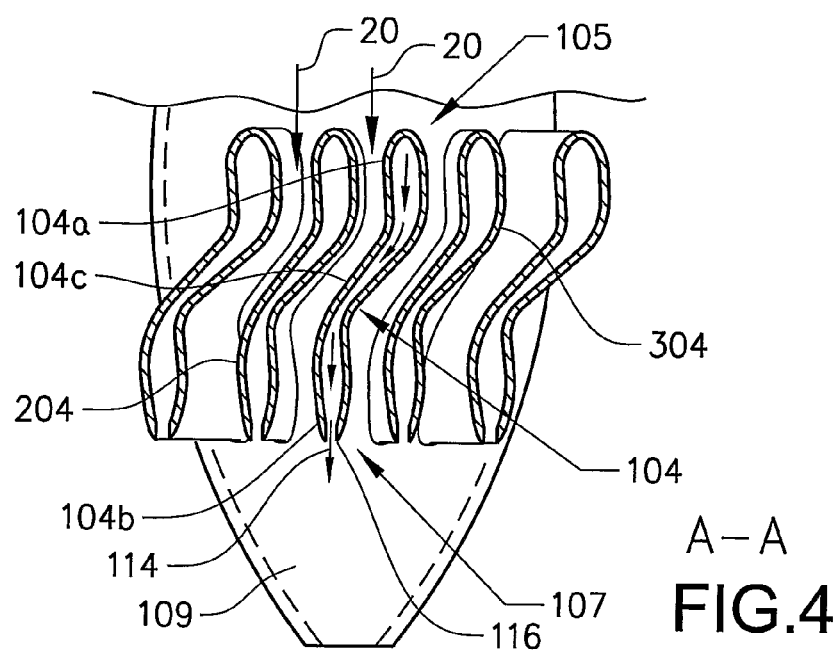
FIG. 4 shows a cross-sectional view of a number of constituent guide vanes of the stator.
Figure 5:
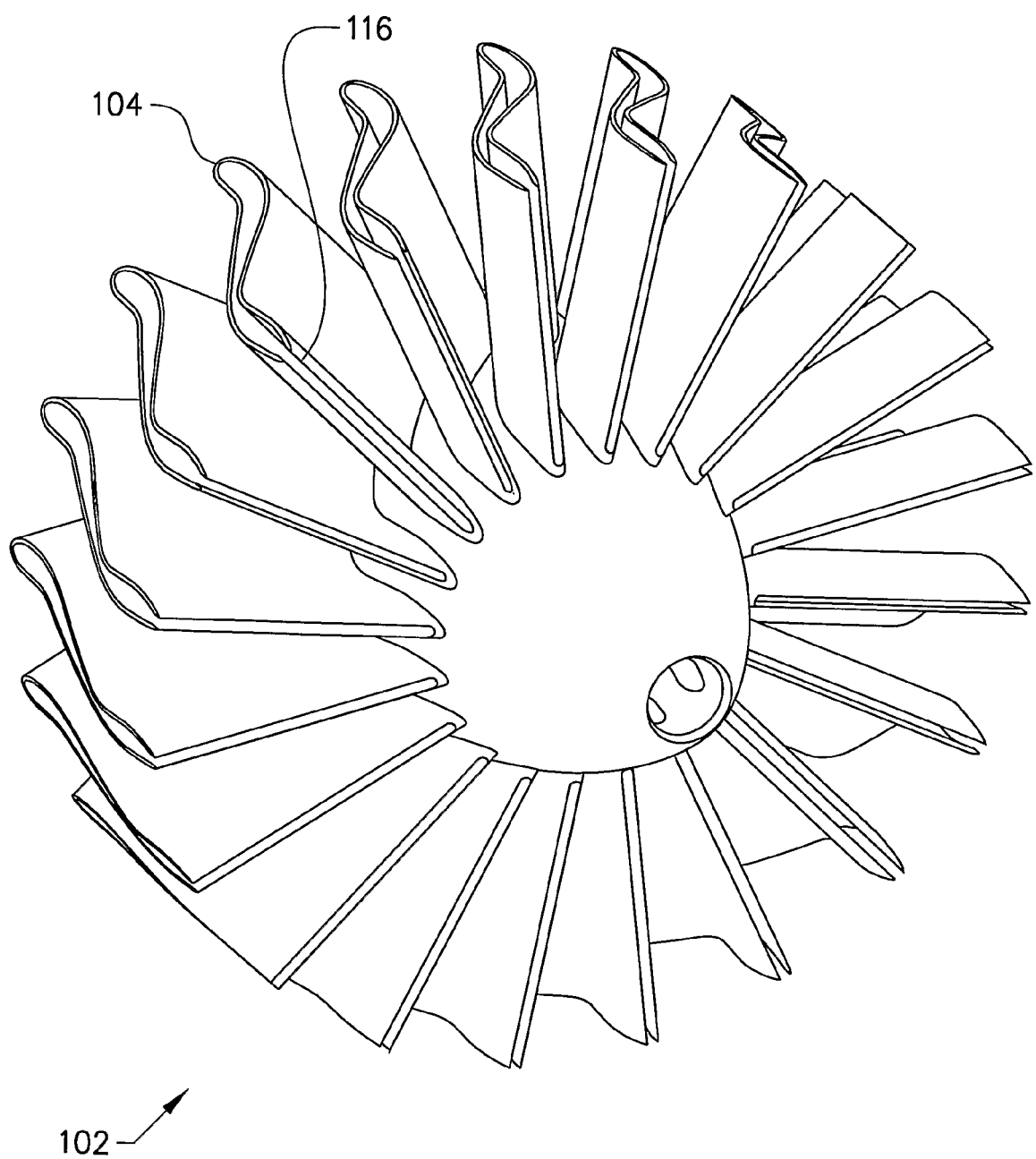
FIG. 5 shows a perspective view of a section of the stator.

The stator 102 has an annular shape and comprises a plurality of guide vanes 104, 204, 304, see also FIGS. 3-5, having an aerodynamic function, which extend in the radial direction of the stator and between them define ducts for leading the core flow 20. The guide vanes 104 are air-cooled. A first side 105 of the stator in its axial direction 24 defines an inlet for the gas and a second side 107, opposite the first side, defines an outlet for the gas, see FIG. 4.

The fan air duct 19 of the jet engine 2 is therefore situated radially outside the turbine wheel 211 right at the back of the turbine 11. At least one of the guide vanes 104 is hollow and is connected to the fan air duct 19 so that air from the fan air duct 19, is led into the guide vane, see the arrow 111.

As an alternative or a complementary addition, the guide vanes 104 can be cooled with external air, which can be taken into the engine via an ejector, for example.

In a further alternative or complementary addition to the aforementioned variants, the guide vanes 104 are cooled by air that is drawn off in the compressor, preferably somewhere in the middle thereof. This variant may be used, for example, in an engine of the turbojet type.

The jet engine 2 further comprises an exhaust cone 109 radially inside the guide vanes 104. The guide vanes 104 are connected to the exhaust cone so that at least a proportion of the air flowing through the guide vane is led into the exhaust cone, see the arrow 115.

The fan air 17 is more specifically divided into a flow 111, which passes into the guide vanes, and a flow 112, which passes to the rear in order to cool the walls of the outlet nozzle 113 of the engine 2. The flow 111 through the guide vanes 104 is further divided into a part 114, which passes out through an elongated opening, or gap 116 in the trailing edge of the guide vane (or possibly through a plurality of separate holes), and a part 115, which goes into the exhaust cone 109 in order to cool the latter. The magnitude of the flows 111, 112, 114, 115 is designed to achieve as low a signature as possible and good component durability.

The stator 102 is described in detail below with reference to FIGS. 3-5. FIG. 3 shows a rear view of the stator 102. FIG. 4 shows a cross-sectional view of the guide vanes 104, 204, 304 along the section line A-A in FIG. 3. FIG. 5 shows a perspective view of a section of the stator 102.

As stated, FIG. 3 shows a rear view of the stator 102, that is to say parallel to the axial direction 24. It will be seen from this that the guide vanes 104, 204, 304 have such a shape that together they completely cover said gas inlet 105 viewed in the axial direction of the stator from the outlet 107 thereof. This means that the turbines 11, 12, which are situated inside the stator 102 and which become hot in operation, will be hidden, resulting in a reduced signature. The guide vanes 104, 204, 304 therefore at least partially have a shape that is curved, or inclined at an angle to the axial direction 24.

The guide vane 104 comprises an inlet section 104a and an outlet section 104b, which both basically extend in an axial direction. A section 104c of the guide vane 104 situated between the inlet section 104a and the outlet section 104b extends in a direction with a component in the circumferential direction of the stator. The guide vane may thereby be said to have an elongated S or Z-shape. Viewed in an axial direction, the intermediate section 104c is furthermore of a length sufficient to substantially cover the space between two adjacent guide vanes 104. It can in other words be said that a certain overlap exists between two adjacent guide vanes 104, 204, 304 in the circumferential direction.

In an alternative to an inlet section 104a extending basically in an axial direction, the inlet section is angled, that is to say inclined at an angle to the axial direction 24. This is advantageous since the turbine wheel 211 which is situated immediately upstream generates a rotating gas flow, a so-called swirl. The outlet section 104b of the guide vane 104 may also be angled in relation to the axial direction 24. With such a guide vane shape the guide vane could be made shorter, which would save weight. The guide vane which is illustrated in FIG. 4 could then be "cut off" before the outlet section has a fully axial orientation.

The stator 102 suitably comprises an outer ring 120 arranged radially outside the gas duct 18 for the core flow 20, and an inner ring 109, here in the shape of a part of the exhaust cone, arranged radially inside the gas duct. The guide vanes 104 extend radially between the rings 109, 120 and are firmly connected to these. The outer ring 120 defines the inner duct 18 for the core flow 20 and the outer duct 19 for the fan flow 17. The guide vanes 104, 204, 304 comprise a radially outer opening, which is connected to the fan air duct 19 in order to lead a proportion of the fan air into the interior of the guide vane and to cool the guide vane. The stator 102 forms as load-bearing case in the jet engine 2. The stator is designed to transmit a mechanical load between an outer shell 120, in the form of the outer ring, and an inner bearing 21. The stator 102 therefore supports the load between the outer shell, which is mechanically connected to an engine mount, and a rear bearing, in the form of the bearing of the low-pressure rotor, or alternatively the bearing of the high-pressure rotor, or both of these. bearings. The high-pressure rotor and the low-pressure rotor are naturally also supported in a front section of the jet engine (not shown).

The stator 102 therefore constitutes a rear engine case. The load-bearing, rear case 102 is also referred to as the "Turbine Exhaust Case" (TEC).

The term "jet engine" as used above is intended to include various types of engines which take in air at a relatively low velocity, heat it up through combustion and expel it at a much higher velocity. The term "jet engine" includes turbojet engines and turbofan engines, for example.

The invention must not be regarded as being limited to the exemplary embodiments described above, a number of further variants and modifications being feasible without departing from the scope of the following claims.

As an alternative to a stator 102 constituting a rear engine case, the stator with the guide vanes may feasibly be located behind an existing engine case.

The guide vanes may have a shape, for example, which differs from the shape shown in FIG. 4. For example, the scope of the patent claims allows for guide vanes having a wing shape extending in a relatively straight line and for their inclined arrangement at an angle to the axial direction 6. The guide vanes may furthermore extend in a curve, having a partially circular shape, for example. Combinations of more rectilinear and curved shapes are also feasible.

The invention may naturally also be used for cross-sectional shapes of the outlet nozzle other than a circular shape, or annular shape. For example, the invention can also be implemented for an expanded cross-sectional shape, such as an elliptical shape.

Furthermore, the stator 102 need not necessarily support a bearing.

The cooling described above is convective cooling. Other cooling methods, such as film cooling, internal ducts with jets etc. may also be used as a complementary addition or alternative.

The invention can obviously be used for types of airplane other than that shown in FIG. 1. The jet engine of the airplane may be centrally located in the airplane fuselage, for example.

The invention claimed is:

1. A stator for installation in a rear section of a jet engine, the stator comprising
 a plurality of hollow guide vanes which extend in a radial direction of the stator and between them define ducts for leading a gas,
 a first side of the stator in its axial direction defining an inlet for the gas,
 a second side, opposite the first side, defining an outlet for the gas, and
 a radially outer ring to which the guide vanes are connected, the outer ring defining an inner duct for a core flow and a outer duct for a fan flow,
 wherein the guide vanes have such a shape that together they at least substantially cover the gas inlet viewed in the axial direction of the stator from the outlet side thereof, wherein each of the guide vanes comprises an inlet section, an outlet section and an intermediate section located between the inlet section and the outlet section, the intermediate section extending in a direction with a component in the circumferential direction of the stator, the intermediate section being of a length sufficient to at least substantially cover a space between two adjacent vanes, the guide vanes each comprise a radially outer opening connected to the outer duct and leading into an interior of the guide vane and at least one outlet opening from the interior of the guide vane to a side of the guide vane facing the outlet side of the stator, the guide vanes are arranged to lead a coolant from the outer duct into the interior of the guide vane through the radially outer opening and out of the interior of the guide vane through the at least one outlet opening, and a mechanical load is transmitted by the stator between the outer ring and an inner hearing.

2. The stator as claimed in claim 1, wherein two adjacent guide vanes overlap one another in a circumferential direction viewed in the axial direction of the stator from the outlet side thereof.

3. The stator as claimed in claim 2, wherein each of the guide vanes extends at least partially in a direction with a component in a circumferential direction of the stator.

4. The stator as claimed in claim 2, wherein both an inlet section and an outlet section of each guide vane extend basically in an axial direction and a section between the inlet section and the outlet section extends in a direction with a component in a circumferential direction of the stator.

5. The stator as claimed in claim 1, wherein each of the guide vanes extends at least partially in a direction with a component in a circumferential direction of the stator.

6. The stator as claimed in claim 1, wherein a plurality of the guide vanes have a curved cross-sectional shape.

7. The stator as claimed in claim 1, wherein a plurality of the guide vanes have a basic cross-sectional shape of an elongated Z.

8. The stator as claimed in claim 1, wherein the stator forms at least part of a rear engine case.

9. A jet engine, comprising a stator as claimed in claim 1, the stator being installed behind a rear turbine wheel in the jet engine.

10. The jet engine as claimed in claim 9, wherein the stator forms at least part of a rear engine case.

11. The jet engine as claimed in claim 9, wherein the jet engine comprises a duct radially outside a rear turbine for passage of fan air.

12. The jet engine as claimed in claim 11, wherein the jet engine comprises an inner annular structure radially inside the guide vanes and the hollow guide vane is connected to the inner annular structure so that at least a portion of air flowing through the guide vane is led into the inner annular structure.

13. The jet engine as claimed in claim 9, wherein the jet engine is of a turbofan engine type.

14. An aero engine, comprising a jet engine as claimed in claim 9 for propulsion.

15. The stator as claimed in claim 1, wherein the length of the intermediate section is sufficient to completely cover the space between two adjacent vanes.

* * * * *